(No Model.)
F. B. BRACKING.
BUTTON AND GLOVE HOOK.
No. 289,213. Patented Nov. 27, 1883.
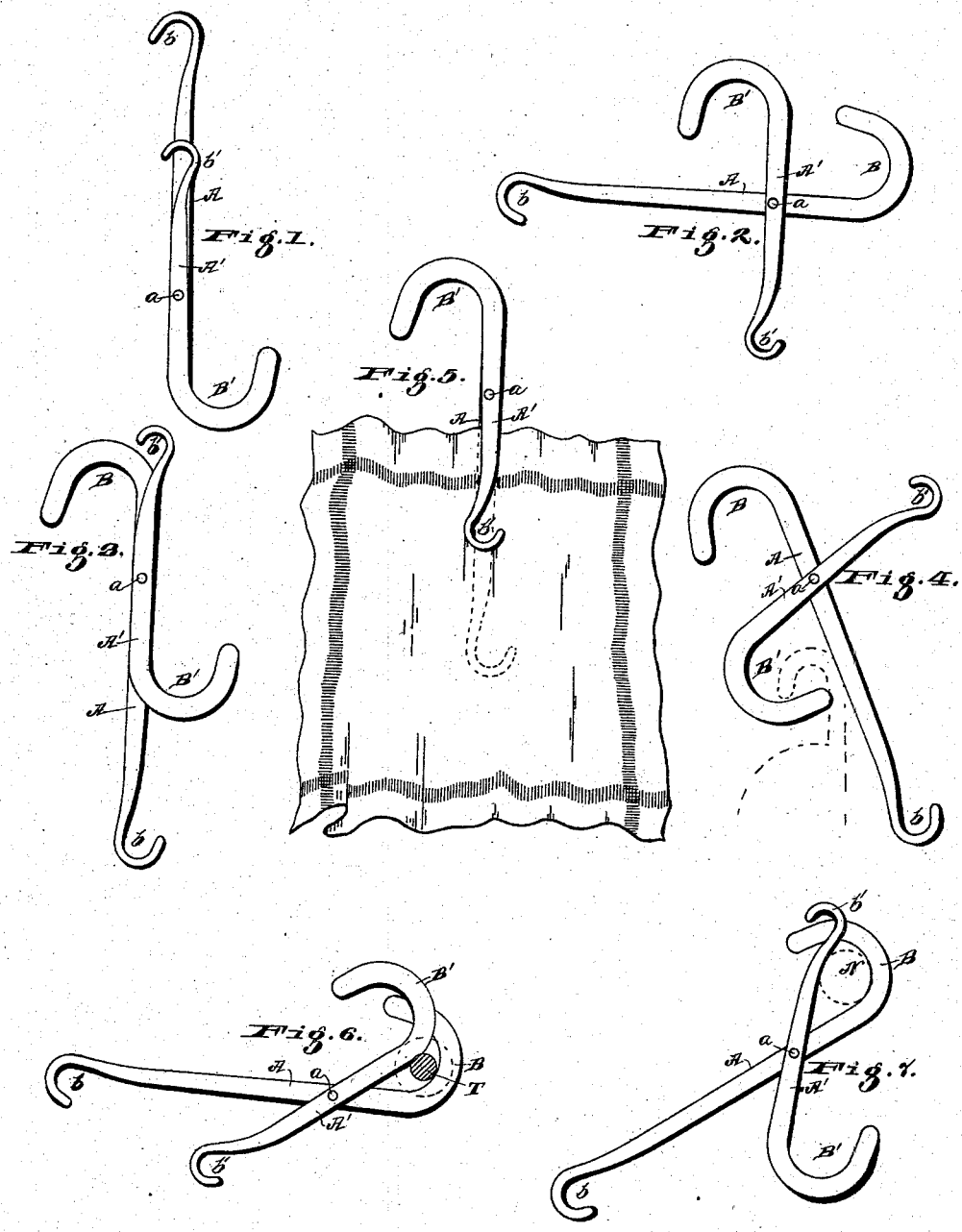
Attest: Ed. R. Hill, Wm. Stehli
Inventor: Frank B. Bracking
per Wm. Hubbell Fisher, Atty.

UNITED STATES PATENT OFFICE.

FRANK B. BRACKING, OF CINCINNATI, OHIO.

BUTTON AND GLOVE HOOK.

SPECIFICATION forming part of Letters Patent No. 289,213, dated November 27, 1883.

Application filed May 22, 1883. (No model.)

To all whom it may concern:

Be it known that I, FRANK B. BRACKING, of the city of Cincinnati, in the county of Hamilton and State of Ohio, have invented certain new and useful Improvements in Combination Implements, of which the following is a specification.

The object of my invention is to provide in one implement a device which may be employed for a variety of purposes, the implement being in such a compact form that it may be conveniently carried in the pocket of the possessor.

The drawings forming part of this specification represent the implement as it is applied to various purposes to which it is applicable.

This implement consists in general of two pieces, A and A', pivoted together at $a$. One end of the piece A is bent to form a hook, B, and on the other end of said piece is formed a button-hook, $b$, of the required size for buttoning shoes. One end of the piece A' is bent to form a hook, B', the curvature of which is similar to the curvature of the hook B on the piece A, and these hooks B and B', when the pieces A and A' are brought parallel to each other, coincide with each other throughout, as shown in Fig. 1. On the end of the piece A', which is opposite the hook B', is formed a button-hook, $b'$, which is smaller than the button-hook $b$, and is adapted for use as a glove-buttoner. The piece A' is shorter than the piece A, as shown, so that the glove-buttoner $b'$ will not interfere with the shoe-buttoner $b$ when the latter is to be used.

When the implement is to be used as a shoe-buttoner, it presents the appearance shown in Fig. 1, the hooks B and B' serving as a handle to the implement. When it is to be used as a glove-buttoner, the piece A' is turned at an angle to the piece A, as shown in Fig. 2, in which position the hook B', together with the piece A, will serve as a handle for the glove-buttoner.

Fig. 3 represents the implement as employed for a coat or cloak hook, the levers A and A' being so turned as that the hooks B and B' will be opposite to each other. In this position the hook B may be hooked over the back of a chair, or onto a gas-fixture or other convenient point, and the coat may then be hung on the hook B'.

Fig. 4 represents the position of the implement when in use as a hat-hook, in which position the hook B' is hooked under the edge or rim of the stiff hat-rim, the latter being shown in dotted lines, and the hook B is hung on the back of a chair or other convenient point. The lower end, $m$, of the lever A will keep the hat-rim in contact with the hook B, and the hat will thus be securely held by the implement. As a coat or hat-hook this implement will be a great convenience in a church or theater, or at any other crowded assemblage, or in the railroad-cars while traveling.

Fig. 5 represents the implement employed as a napkin-holder, the napkin being securely held between the pieces A and A'. The hooks B and B' coincide with each other, may be hooked over the collar, and the napkin will thus be held in a position to protect the breast of the wearer.

Fig. 6 represents the implement as employed for clipping off the end of a cigar, the outline of a cigar being denoted by dotted lines, and the tip of the cigar to be cut off being represented by solid lines and indicated by letter T. The contact-surfaces between the pivoted levers A and A' being flat, a shearing action is produced when the hooks B and B' are separated and brought together. These hooks are separated, as shown in Fig. 6, and the tip of a cigar being placed under the hook B, the hooks are brought together, and the tip of the cigar is thus clipped off.

Fig. 7 represents the implement employed as a cigar-holder, a cigar being indicated by dotted lines, the piece A' being turned so that the end which is provided with the button-hook $b'$ will be opposed to the hook B of the piece A, and the cigar may be held between this hook B and the end of the piece A', as shown in said Fig. 7.

I have thus illustrated seven different uses to which my invention is applicable. If desired, instead of forming a glove-buttoner on the end of the lever A', a finger-nail cleaner may be formed thereon. The pieces A and A', pivoted together and provided with the respective hooks B and B', are of primary importance, even when the button-hook or the glove-hook, or both said button and glove hook, are dispensed with.

The implement may be made of any suitable material.

Having thus described my invention and its various applications, what I claim as new, and desire to secure by Letters Patent, is as follows:

The herein-described combination implement, consisting of the levers A and A', pivoted together, the lever A being provided at one end with a hook, B, and at the other end with a button-hook, b, and the lever A' being provided at one end with a hook, B', of a similar shape to the hook B and at the other end with a glove-buttoner, b', portions of the levers being provided with cutting-edges, substantially as and for the purposes specified.

FRANK B. BRACKING.

Witnesses:
J. WM. STREHLI,
MILTON HILL.